May 23, 1944.　　　A. R. THOMPSON　　　2,349,566
APPARATUS FOR PROCESSING CANNED GOODS
Filed May 5, 1942　　　3 Sheets-Sheet 1
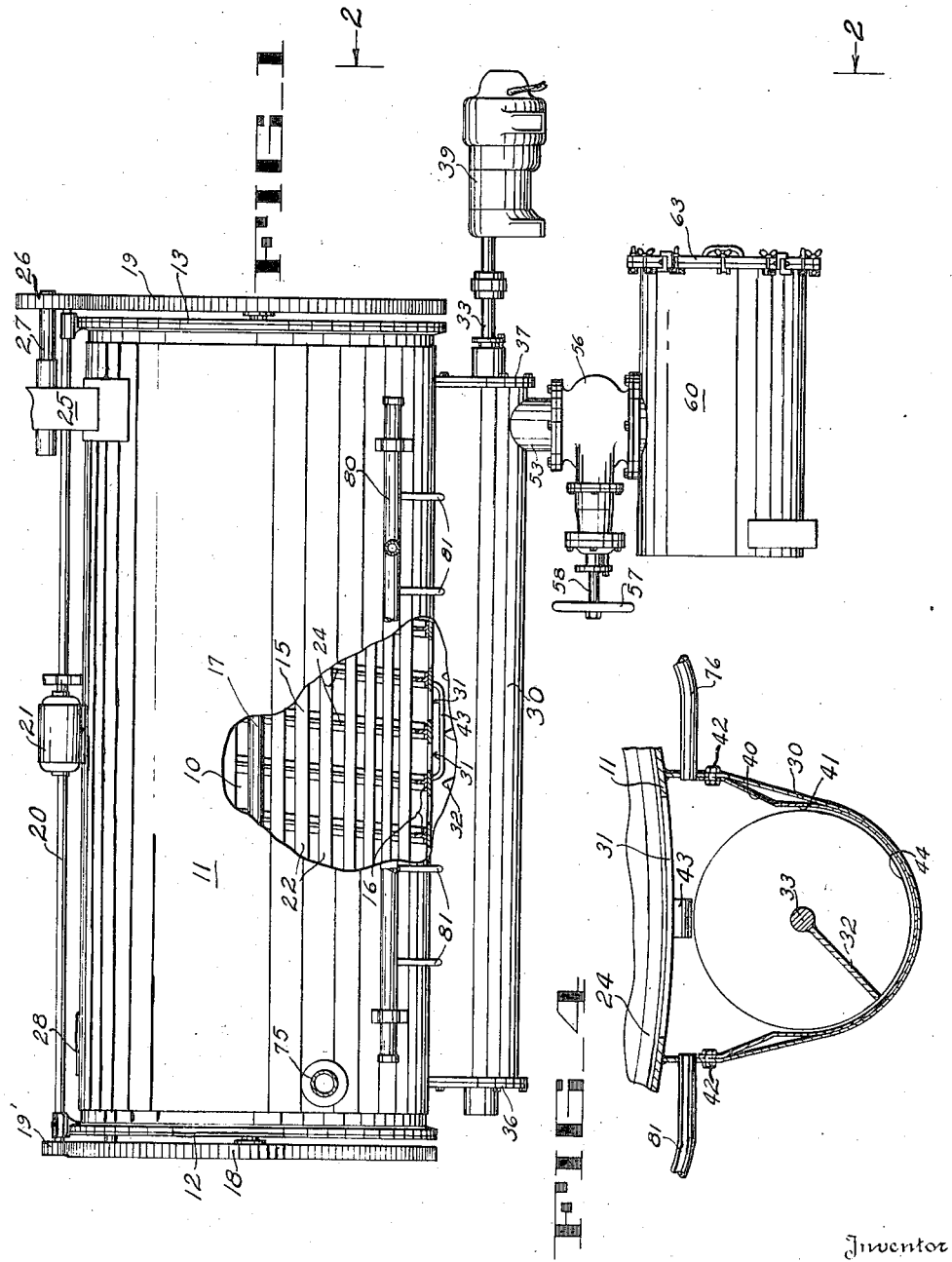
Inventor
ALBERT R. THOMPSON
Attorney

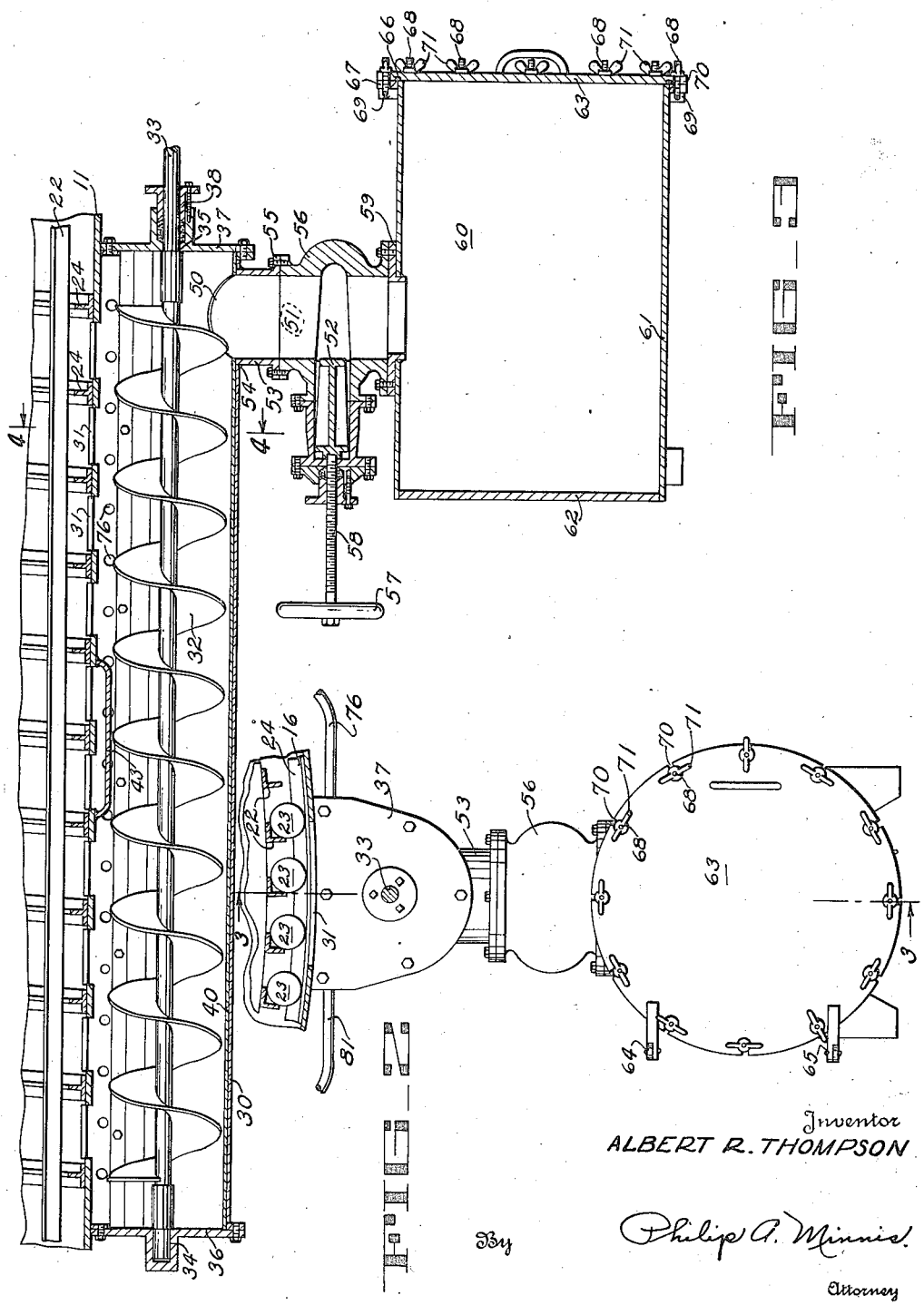

May 23, 1944. A. R. THOMPSON 2,349,566
APPARATUS FOR PROCESSING CANNED GOODS
Filed May 5, 1942 3 Sheets-Sheet 3
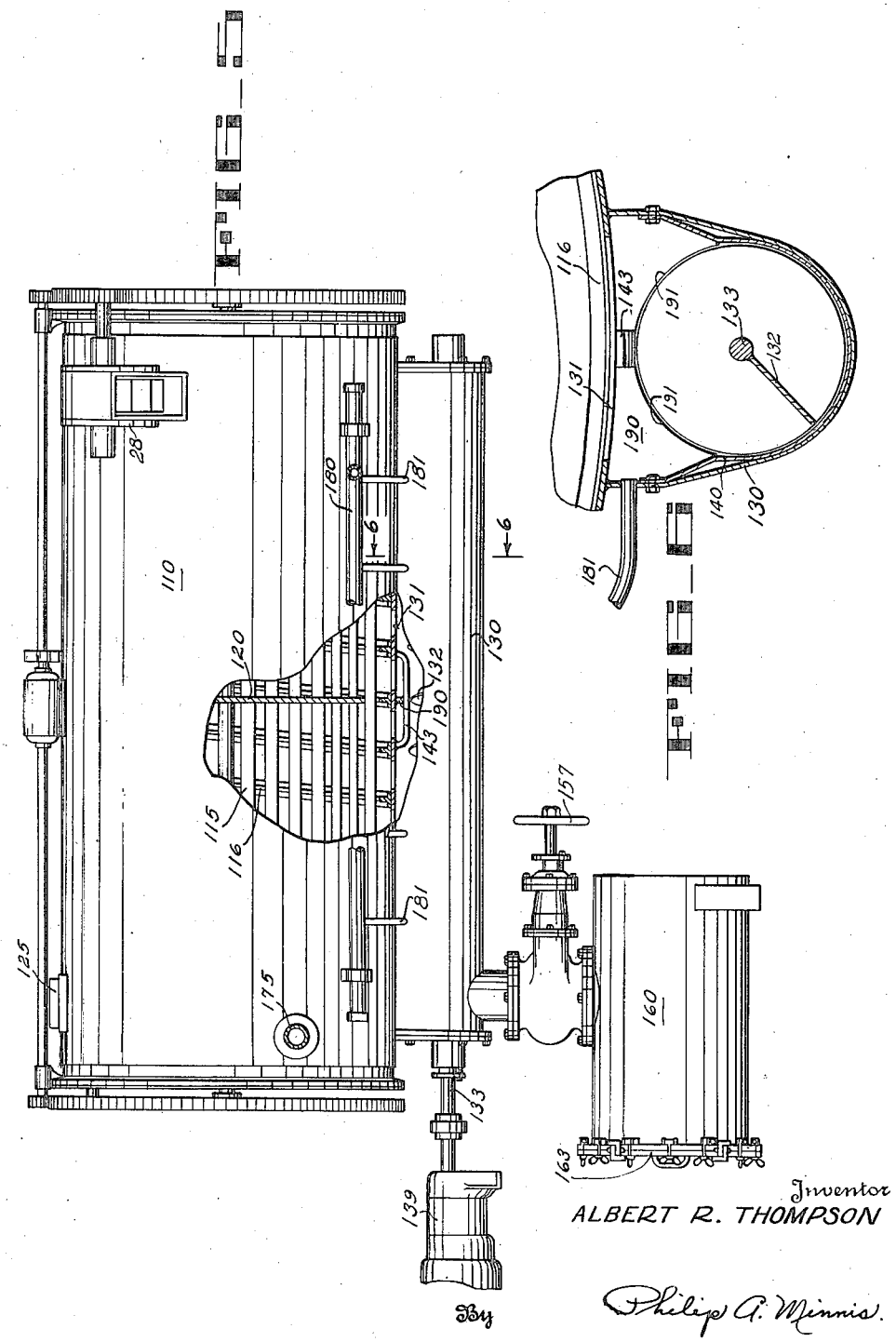
Inventor
ALBERT R. THOMPSON
By Philip G. Minnis.
Attorney Patented May 23, 1944

2,349,566

UNITED STATES PATENT OFFICE 2,349,566

APPARATUS FOR PROCESSING CANNED GOODS

Albert R. Thompson, Los Gatos, Calif., assignor to Food Machinery Corporation, San Jose, Calif., a corporation of Delaware Application May 5, 1942, Serial No. 441,763

15 Claims. (Cl. 99—359)

This invention relates to apparatus for handling containers and more particularly to apparatus of the so-called continuous type for processing food products packed in frangible containers, such as glass jars.

In the conventional continuous method of food processing the sealed containers packed with the food products, either liquid or solid or both, are conveyed in continuous procession through a heating chamber supplied with a suitable heating medium, such as hot water, steam or both, maintained at a temperature sufficient to effect sterilization, and then through a cooling chamber in which cool water generally serves as the cooling medium. In this manner, each container is subjected to the same treatment as it passes through the apparatus, thus standardizing the procedure and enabling large scale operations. When the product is packed in glass containers employing pressure-sealed closures, the heating and cooling chambers are maintained under pressure above atmospheric by suitable means, such as air pressure, and sufficient pressure is maintained to keep the closures sealed on the container during the processing.

In the course of processing food products packed in glass containers there has always been a certain percentage of containers broken on account of flaws in the glass, shock due to sudden temperature changes, rough handling, and so forth, and it is necessary to remove the pieces of broken containers, and the spilled food from the chambers to prevent it from accumulating and interfering with the operation of the conveying mechanism. Heretofore this has necessitated complete shut down of the processing operations to enable cleaning out of the chambers, since it has been necessary to open up the chambers to drain any water therefrom and to remove the debris. This not only causes substantial loss of time and expense but also results in relieving the pressure in the chambers so that much of the product in the chambers at the time may be spoiled. Moreover, the waste of heat and water is also a factor of expense to the operator.

The present invention aims to provide simple, efficient and readily controlled apparatus for eliminating the aforesaid losses, by providing suitable means for removing the debris of broken containers and spilled food from the chambers without shutting down or opening up the processing equipment.

A further object is to avoid cold air pockets in the processing chamber conducive to breakage of containers by providing suitable connection of the air inlet to obtain warm air in the air space of the chamber.

These and other objects of the invention will be more readily understood from the following description taken in conjunction with the accompanying drawings in which:

Fig. 1 is a side elevation of a cooker embodying my invention, the shell of the cooking chamber being broken away to reveal a portion of the reel and track for conveying the containers therethrough.

Fig. 2 is an end view, taken as indicated by the arrows 2—2 in Fig. 1, of the lower part of the cooker, part of the shell being shown in section.

Fig. 3 is a vertical longitudinal section taken as indicated by the arrows 3—3 in Fig. 2.

Fig. 4 is a fragmentary section, taken as indicated by the arrows 4—4 in Fig. 3.

Fig. 5 is a side elevation of a cooler embodying my invention, part of the shell being broken away.

Fig. 6 is a fragmentary section thereof, taken as indicated by the arrows 6—6 in Fig. 5.

The cooker comprises a fluid and pressure tight chamber 10 (Fig. 1) formed by means of a cylindrical shell 11, the ends of which are enclosed by heads 12 and 13. A rotary reel 15 and helical track 16, both of conventional construction, are employed for advancing the containers in continuous procession through the chamber. The reel 15 is supported by a shaft 17 journaled in the heads 12 and 13. Gears 18, 19 are keyed to the ends of the reel shaft and are driven from pinions 19' on the opposite ends of a drive shaft 20 which is driven from a motor 21.

A series of longitudinally extending angle-iron pusher bars 22 (Figs. 1, 2 and 3) on the reel serve to advance the containers 23 in rolling procession along the track 16 which consists of a T-section rail 24 (Fig. 3) secured to the interior of the cylindrical shell in the form of a helix, as shown in Fig. 1. The track 16 extends from the inlet end of the chamber to the discharge end and guides the containers in procession through the chamber. The containers are introduced one after another into the chamber and deposited between the pusher rails 22 by means of a rotary, pocketed, pressure-tight feed valve 25 (Fig. 1) of conventional construction. The turret of this valve is rotated from reel gear 19 by means of a pinion 26 on the turret shaft 27. Upon arrival at the discharge end of the cooker the containers are transferred to the cooler by a pressure-tight transfer valve 28 (Figs. 1 and 5) of conventional construction, which communicates with the cooker and cooler shells.

A fluid and pressure-tight U-shaped trough 30 (Figs. 1, 3 and 4) extending longitudinally along the bottom of the cooker is secured to the shell as by welding. This trough communicates with the interior of the chamber 10 by means of apertures 31 (Figs. 1, 2, 3 and 4) in the bottom of the shell 11, between the rails 24. The fragments, parts and spillage of containers broken in the chamber 10 drop down through the apertures 31 into the trough 30 and are removed therefrom by means of a conveyor, such as the screw conveyor 32 (Fig. 3), the shaft 33 of which is suitably journaled at 34, 35 in the ends 36, 37 respectively of the trough. The shaft 33 extends out through a packing gland 38 and is connected to a motor 39 (Fig. 1) which provides the power for rotating the screw conveyor 32.

The trough 30 has a removable liner 40 (Fig. 4) which has a semi-cylindrical portion 41 encompassing the screw 32. The upper edges of the liner 40 are attached to the trough 30 by means of bolts 42. A shoe 43 (Figs. 3 and 4) secured to the bottom of the shell 11 extends longitudinally above the central portion of the screw 32. There is normally a small amount of clearance between the shoe and the screw but when fragments of glass get between the liner 40 and the lower edge 44 (Fig. 4) of the screw, the latter, because of its length may be sprung upwardly, particularly at the center. When this occurs the shoe 43 serves to maintain the screw in cooperative relation with the liner so that it may continue to clear the fragments out of the trough. The abrasive action of the material is borne by the liner 40 which can be removed when worn by removing the ends 36 and 37 of the trough, withdrawing the screw 32, removing the bolts 42 and withdrawing the liner through the end of the trough. The worn liner can then be replaced by a new one, thus preserving the trough.

At the discharge end of the conveyor 32 there is an outlet 50 (Fig. 3) in the trough which leads to a downwardly extending conduit 51 which may be closed by a gate valve 52. For this purpose a section of pipe 53 is welded to the trough at 54 and has a flange coupling 55 with the body 56 of the valve. The gate valve is of conventional construction and will not be described in detail. It has the usual wheel 57 and screw 58 for opening and closing the valve.

The lower or discharge side of the valve is connected by a flange coupling 59 with a fluid and pressure-tight collection chamber 60. This chamber is formed by means of a cylindrical shell 61, one end of which is permanently closed by a welded head 62, and the other end of which is closed by means of a door 63, hinged at 64, 65 (Fig. 2). The door when closed is sealed by a gasket 66 (Fig. 3) which is pressed against a flange 67 on the shell. To secure the door tightly against the flange a series of studs 68 are provided which are pivoted on blocks 69 welded to the flange 67 and adapted to be swung into notches 70 (Fig. 2) in the periphery of the door. Wing nuts 71 are threaded on the studs 68. To open the door the nuts 71 are loosened and the studs are swung out of the notches. The debris of broken containers discharged from the conveyor 32 fall by gravity down the conduit 51 into the collection chamber 60 which can be periodically cleaned out by closing the valve 52 and opening the door 63.

In operation, the chamber 10 (Fig. 1) is half filled with water through a suitable pipe connection 75 (Fig. 1). Steam is then introduced by means of a series of pipes, such as pipe 76, (Fig. 4), into the trough 30. The admission of steam is controlled to obtain and maintain the desired sterilizing temperature in the chamber. In addition to aid in retaining the covers of the containers in place against pressure developed within the containers the pressure within the processing and connected chambers is built-up by the admission of air under pressure. The extent of pressure superimposed upon the heating medium is preferably in the order of 15 lbs. above the corresponding pressure of the steam. The air is introduced by means of a manifold 80 (Fig. 1) having a series of pipes 81 communicating with the trough 30. It will be observed that the air is thus passed through the hot water and consequently is warm before reaching the air or steam space of the processing chamber. If the air was introduced directly into the air or steam space the formation of cold air pockets which might cause sudden chilling of the containers could occur. It will be understood that the pipes 80 may be connected above the water level of the chamber if desired especially in the cooler hereafter described, in which event the connection is preferably made where it will have the least sudden chilling effect upon the containers. For an operating temperature of 240° F., for example, an air pressure of about 25 lbs. per square inch gauge pressure would be maintained. As explained previously, when pressure-tight closures are used on the containers, the external pressure on the containers must exceed the maximum internal pressure generated within them by the sterilizing temperature to which they are subjected. It will be apparent that the steam and air introduced into the trough 30 will reach the chamber 10 through the apertures 31 in the bottom of the shell 11.

The manner in which the debris of the containers broken during processing is removed from the cooker will now be explained. The fragments drop through the apertures 31 into the trough 30 from which they are removed by the screw conveyor 32 to the conduit 51 which leads to the chamber 60. By closing the valve 52 the water, heat, and pressure are retained substantially without loss in the cooker while the container debris is being removed from the chamber 60. Also the cooker need not be shut down or interrupted in operation in order to remove the debris.

The cooler shown in Figs. 5 and 6 is similar in construction to the cooker and is likewise provided with means to remove the debris of containers broken during processing therein. As previously explained, the containers after leaving the cooker are transferred to the cooler by means of the transfer valve 28 (Figs. 1 and 5) in a well-known manner. The containers are conveyed through the cooling chamber 110 by means of rotary reel 115 and a helical track 116 and discharged to suitable conveying means at 125 (Fig. 5). A trough 130 is secured to the bottom of the chamber and communicates therewith through apertures 131. The chamber is supplied with cooling water through the connection 175. In order to prevent circulation of the cooling water from one end of the chamber to the other, a baffle plate 120 is placed in the reel. This serves to maintain a temperature differential between the inlet and discharge ends of the chamber. The reason for maintaining this differential is that the water in the inlet end should be at a higher temperature than at the discharge end in order not to subject the containers, especially if of glass, to too cold a medium when they first enter the chamber because, if subjected with too great a temperature change, the hot containers may be shocked and breakage may result. The cooler is maintained under pressure by air introduced through manifold 180 and pipes 181 into the trough 130.

The means for removing the broken glass from the trough is the same as that employed in the cooker. The trough 130 (Fig. 6) is provided with a removable liner 140 in which the screw 132 operates. A shoe 143 maintains the screw in operative position in the liner. To prevent circulation of the cooling water longitudinally of the trough a baffle plate 190 is placed therein in the same plane as the baffle plate 120, as shown in Fig. 5. This baffle plate has a semi-circular lower edge 191 which encompasses the upper half of the screw 132. In the cooler the shoe 143 performs the additional function of preventing the screw from engaging and catching on the baffle.

The shaft 133 of the screw is connected to a motor 139 by means of which it is continuously rotated to remove the fragments to the discharge end of the trough from which they drop into the collection chamber 160. Periodically the chamber 160 is cleaned out by closing the gate valve 157 and opening the door 163.

While the particular apparatus herein described is well adapted for carrying out the objects of the present invention it will be understood that various modifications, changes and substitutions may be made without departing from the spirit of the present invention and the present invention is to be construed to include all such modifications, changes and substitutions as may come within the scope of the following claims.

What I claim as new and desire to protect by Letters Patent is:

1. An apparatus for processing food products packed in frangible containers comprising, a processing chamber in which the containers are subject to processing in a continuous procession, a collection chamber independent of said processing chamber for receiving the debris of containers broken during processing, a conduit leading from said processing chamber to said collection chamber, means associated with said processing chamber for transferring the debris from said processing chamber to said conduit to be discharged into said collection chamber and normally open closure means operable to close off said conduit when removing debris from said collection chamber.

2. An apparatus for processing food products packed in frangible containers comprising, a closed chamber in which the containers are subjected to the processing under pressure above atmospheric, a normally closed collection chamber, means including a conduit to conduct the debris of containers broken in said processing chamber to said collection chamber, and valve means in said conduit operable to cut off communication between said processing chamber and collection chamber whereby the pressure may be maintained in said processing chamber and said collection chamber may be opened to remove debris therefrom without interrupting the processing in said processing chamber.

3. An apparatus for processing food products packed in frangible containers comprising, a chamber in which the containers are subjected to the processing, conveyor means for removing from said processing chamber the debris of containers broken in said chamber, a collection chamber, a conduit interconnecting said processing chamber and collection chamber for receiving the debris discharged by said conveyor means and for directing said debris to said collection chamber, valve means in said conduit to cut off communication between said chambers when removing the debris from said collection chamber, said collection chamber having an aperture through which the collected debris may be removed, and means to close and seal said aperture.

4. An apparatus for processing food products packed in frangible containers comprising, a processing chamber in which the containers are subjected to processing in a continuous procession and at pressure above atmospheric, a collection chamber for receiving the debris of containers broken in said processing chamber during processing therein, conveyor means associated with said processing chamber for directing said debris from said processing chamber to said collection chamber and closure means operable to seal said processing chamber from said collection chamber when removing debris from the collection chamber whereby the debris may be removed from said collection chamber without interrupting said processing.

5. An apparatus for processing food products packed in frangible containers comprising, a chamber in which the containers are subjected to the processing, a conveyor to remove the debris of broken containers from the bottom of said chamber, a second chamber, a conduit to conduct the debris discharged from said conveyor to said second chamber, and valve means in said conduit operable to seal said processing chamber from the second chamber whereby the debris may be removed from said second chamber without interrupting the processing in said processing chamber.

6. An apparatus for processing food products packed in frangible containers comprising, a closed chamber in which the containers are processed under pressure, a trough extending along the bottom of said chamber to receive the debris of containers broken in said chamber, a second closed chamber in which the debris is collected, said second chamber communicating with said trough, and a screw to remove the debris from said trough to said second chamber.

7. An apparatus for processing food products packed in frangible containers comprising, a closed chamber in which the containers are processed under pressure, a trough extending along the bottom of said chamber to receive the debris of containers broken in said chamber, a second closed chamber in which the debris is collected, said second chamber communicating with said trough, a screw to remove the debris from said trough to said second chamber, and a valve to cut off communication between said trough and said second chamber.

8. An apparatus for processing food products packed in frangible containers comprising, a shell having closed ends, a track in said shell to guide the containers, means to advance the containers along said track, a trough extending along the bottom of said shell, said shell being apertured between the rails of said track to permit the debris of broken containers to drop into said trough, said trough having a discharge outlet, and a screw to move the debris to said outlet.

9. An apparatus for processing food products packed in frangible containers comprising, a cylindrical shell having closed ends, means in said shell for conveying the containers therethrough in continuous procession comprising a rotary reel and a helical track, a trough extending along the bottom of said shell, said shell having apertures in the bottom between the rails of said track to permit the debris of broken containers to drop into said trough, said trough having a discharge outlet, a screw to move the debris to said outlet, and means for rotating said screw.

10. An apparatus for processing food products packed in frangible containers comprising, a chamber in which the containers are subjected to the processing, a trough at the bottom of the chamber to which the debris of containers broken in said chamber may pass from said chamber, a screw in said trough, a removable liner in said trough having a semi-cylindrical portion encompassing the lower half of said screw for receiving the debris passing into said trough from said chamber, and means to rotate said screw to remove the debris from said trough along said liner.

11. An apparatus for processing food products packed in frangible containers comprising, a chamber in which the containers are subjected to the processing, a trough at the bottom of the chamber to which the debris of containers broken in said chamber may pass from said chamber, said trough having end closures, a screw supported in said closures, a liner removably disposed in said trough and encompassing the lower half of said screw for receiving the debris passing into said trough from said chamber, a shoe overlying said screw to maintain said screw in operative position in said liner, and means to rotate said screw to remove the debris from said trough along said liner, said liner being removable when worn by removing an end closure from said trough and withdrawing said screw and said liner longitudinally from said trough.

12. An apparatus for processing food products packed in frangible containers comprising, a chamber in which the containers are subjected to the processing, means to convey the containers through said chamber comprising a rotary reel and a track, means to supply water to said chamber, a baffle in said reel to prevent circulation of the water from one end of the chamber to the other, a trough at the bottom of the chamber to receive debris of broken containers, a rotary screw in said trough to remove the debris therefrom, a baffle in said trough encompassing the upper portion of said screw, said second baffle being in the same plane as said first baffle in said reel and cooperating therewith to prevent circulation of the water, and a shoe overlying said screw to prevent said screw catching on said baffle and to maintain said screw in operative position in said trough.

13. Apparatus for processing food products packed in frangible containers comprising a receptacle having a chamber in which the containers of food are to be processed, means supplying treating medium to said chamber for processing the containers of food, an open wound helical container guideway in said chamber, rotary means for advancing the containers along said guideway, a trough projecting from the bottom of said receptacle and extending longitudinally thereof, said trough opening into said chamber below said guideway and said guideway providing space between the turns thereof to permit debris of broken containers to drop into said trough, collection means to receive the debris from said trough, and conveyor means for removing the debris from said trough and discharging the same into said collection means.

14. An apparatus for processing food products packed in frangible containers comprising a chamber in which the containers are subjected to the processing, means supplying treating medium to said chamber for processing the containers of food, a collection chamber in which to collect the debris of containers broken in said processing chamber, means including a conveyor at the bottom of the chamber to conduct the debris from said processing chamber to said collection chamber, and normally open closure means operable to close off said collection chamber from said processing chamber, whereby the treating medium in said processing chamber may be retained therein and the processing in said chamber be continued without interruption while debris is removed from said collection chamber.

15. An apparatus for processing food products packed in frangible containers comprising, a chamber in which the containers are subjected to the processing, a rotary reel and an open wound helical track in said chamber for conveying containers through said chamber, a trough at the bottom of the chamber and in communication with the spaces between turns of said track to receive the debris of containers broken in the chamber, a collection chamber for said debris in communication with said trough, a screw journaled at its ends and disposed in said trough, a shoe overlying said screw and comprising a member of less width than said screw and extending lengthwise relative thereto for maintaining said screw in operative position in said trough, and means to rotate said screw to remove the debris from said trough and direct it to said collection chamber.

ALBERT R. THOMPSON.